(12) United States Patent
Song et al.

(10) Patent No.: US 12,165,346 B2
(45) Date of Patent: Dec. 10, 2024

(54) DEVICE AND METHOD FOR DEPTH ESTIMATION USING COLOR IMAGES

(71) Applicant: HUAWEI TECHNOLOGIES CO., LTD., Guangdong (CN)

(72) Inventors: Jifei Song, London (GB); Benjamin Busam, London (GB); Eduardo Perez Pellitero, London (GB); Gregory Slabaugh, London (GB); Ales Leonardis, London (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 113 days.

(21) Appl. No.: 17/969,992

(22) Filed: Oct. 20, 2022

(65) Prior Publication Data

US 2023/0043464 A1 Feb. 9, 2023

Related U.S. Application Data

(63) Continuation of application No. PCT/EP2020/061222, filed on Apr. 22, 2020.

(51) Int. Cl.
*G06T 7/00* (2017.01)
*G06T 7/593* (2017.01)
(Continued)

(52) U.S. Cl.
CPC ............ *G06T 7/593* (2017.01); *H04N 13/15* (2018.05); *H04N 13/239* (2018.05);
(Continued)

(58) Field of Classification Search
CPC .......... G06T 7/593; G06T 2207/10024; G06T 2207/20081; G06T 2207/20084;
(Continued)

(56) References Cited

U.S. PATENT DOCUMENTS 5,267,331 A * 11/1993 Siwoff ................. G09B 21/008
348/E13.067
5,359,675 A * 10/1994 Siwoff ................. H04N 19/597
348/E13.067
(Continued)

FOREIGN PATENT DOCUMENTS

KR 20180096980 A 8/2018

OTHER PUBLICATIONS

Brooks et al., "Unprocessing Images for Learned Raw Denoising," In Proceedings of the IEEE/CVF Conference on Computer Vision and Pattern Recognition, Jun. 2019, 10 pages.
(Continued)

*Primary Examiner* — Frank F Huang
(74) *Attorney, Agent, or Firm* — Fish & Richardson P.C.

(57) ABSTRACT

The present disclosure relates to methods and devices for performing depth estimation on image data. In one example, a device performs depth estimation on first and second images captured using one or more cameras having a color filter array. Each image of the first and second images comprises multiple color channels. Each color channel of the multiple color channels corresponds to a respective color channel of the color filter array. The device performs the depth estimation by estimating disparity from the color channels of the first and second images.

20 Claims, 9 Drawing Sheets

(51) Int. Cl.
*H04N 13/15* (2018.01)
*H04N 13/239* (2018.01)
*H04N 13/257* (2018.01)
*H04N 13/271* (2018.01)
*H04N 25/13* (2023.01)
*H04N 13/00* (2018.01)

(52) U.S. Cl.
CPC ......... *H04N 13/257* (2018.05); *H04N 13/271* (2018.05); *H04N 25/13* (2023.01); *G06T 2207/10024* (2013.01); *G06T 2207/20081* (2013.01); *H04N 2013/0077* (2013.01); *H04N 2013/0081* (2013.01)

(58) Field of Classification Search
CPC .... H04N 13/15; H04N 13/239; H04N 13/257; H04N 13/271; H04N 25/13; H04N 2013/0077; H04N 2013/0081; H04N 13/204
See application file for complete search history.

(56) References Cited

U.S. PATENT DOCUMENTS

| | | | | |
|---|---|---|---|---|
| 6,591,008 | B1* | 7/2003 | Surve | G06T 5/90 |
| | | | | 382/167 |
| 6,611,618 | B1* | 8/2003 | Peli | G06T 5/73 |
| | | | | 382/199 |
| 8,130,263 | B2* | 3/2012 | Chang | H04N 9/68 |
| | | | | 359/630 |
| 8,311,328 | B2* | 11/2012 | Spruck | G06T 5/92 |
| | | | | 382/172 |
| 8,780,113 | B1 | 7/2014 | Ciurea et al. | |
| 8,937,646 | B1* | 1/2015 | Baldwin | H04N 13/189 |
| | | | | 348/42 |
| 9,063,352 | B2* | 6/2015 | Ford | G02C 7/044 |
| 2003/0085991 | A1 | 5/2003 | Toda | |
| 2004/0013314 | A1* | 1/2004 | Peli | G06T 5/10 |
| | | | | 382/254 |
| 2004/0136570 | A1* | 7/2004 | Ullman | G06T 5/75 |
| | | | | 382/114 |
| 2009/0060280 | A1* | 3/2009 | Choi | G06T 7/593 |
| | | | | 382/106 |
| 2011/0090311 | A1* | 4/2011 | Fang | H04N 13/286 |
| | | | | 348/43 |
| 2011/0164122 | A1* | 7/2011 | Hardacker | H04N 13/398 |
| | | | | 348/56 |
| 2012/0127275 | A1 | 5/2012 | Von Zitzewitz et al. | |
| 2014/0219549 | A1 | 8/2014 | Choi et al. | |
| 2015/0189254 | A1 | 7/2015 | Sabater et al. | |
| 2019/0295282 | A1 | 9/2019 | Smolyanskiy et al. | |
| 2022/0006998 | A1* | 1/2022 | Busam | G06T 7/593 |

OTHER PUBLICATIONS

Khamis et al., "StereoNet: Guided Hierarchical Refinement for Real-Time Edge-Aware Depth Prediction," In Proceedings of the European Conference on Computer Vision (ECCV), Jul. 2018, 18 pages.

Liu et al., "A new stereo matching method for Raw image data based on improved SGBM," Proc. SPIE 10845, Three-Dimensional Image Acquisition and Display Technology and Applications, Dec. 12, 2018, 8 pages.

Mayer et al., "A Large Dataset to Train Convolutional Networks for Disparity, Optical Flow, and Scene Flow Estimation," In Proceedings of the IEEE conference on computer vision and pattern recognition, Jun. 2016, 9 pages.

Hirschmuller, "Stereo Processing by Semiglobal Matching and Mutual Information," IEEE Transactions On Pattern Analysis and Machine Intelligence, vol. 30, No. 2, Feb. 2008, 14 pages.

Tonioni et al., "Unsupervised Adaptation for Deep Stereo," In Proceedings of the IEEE International Conference on Computer Vision, Oct. 2017, 9 pages.

Tonioni et al., "Real-time self-adaptive deep stereo," In Proceedings of the IEEE/CVF Conference on Computer Vision and Pattern Recognition, Apr. 2019, 10 pages.

International Search Report and Written Opinion in International Appln. No. PCT/EP2020/061222, mailed on Feb. 4, 2021, 26 pages.

\* cited by examiner

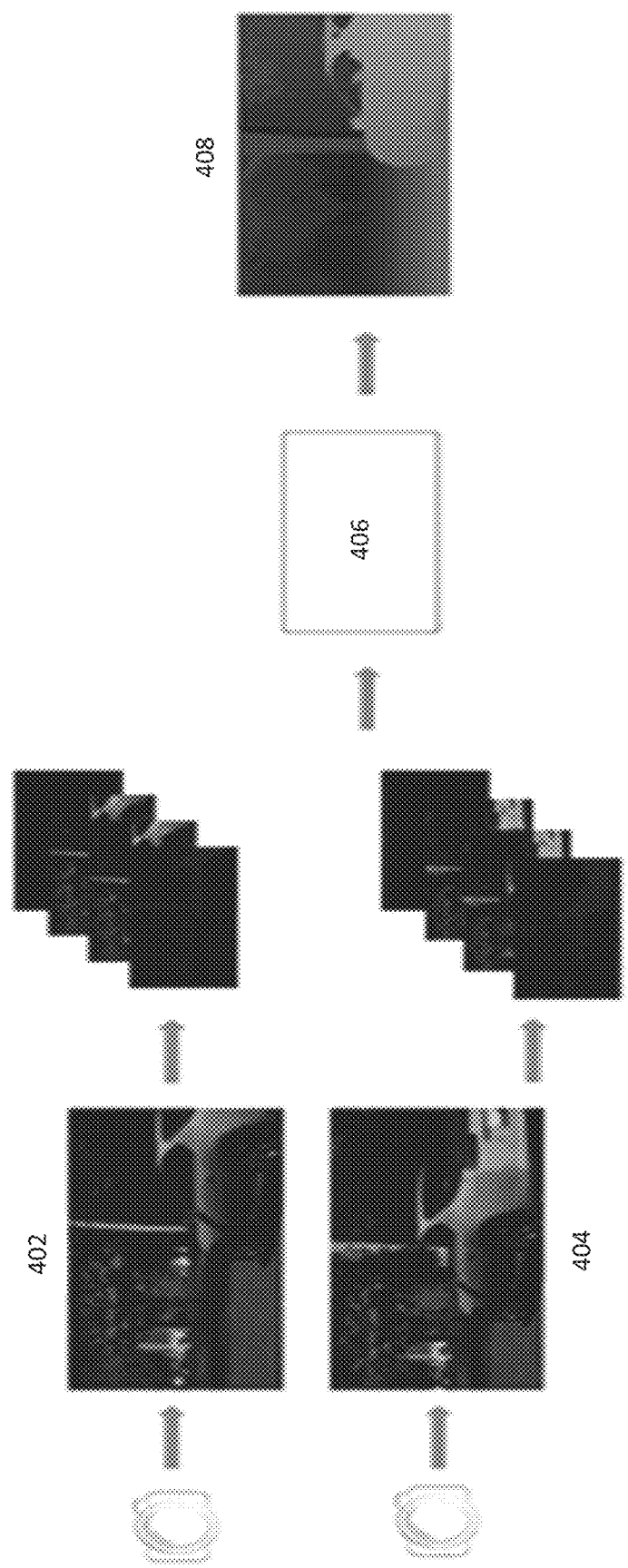

DEVICE AND METHOD FOR DEPTH ESTIMATION USING COLOR IMAGES

CROSS-REFERENCE TO RELATED APPLICATIONS

This application is a continuation of International Application No. PCT/EP2020/061222, filed on Apr. 22, 2020, the disclosure of which is hereby incorporated by reference in its entirety.

FIELD OF THE INVENTION

This invention relates to depth estimation from image data.

BACKGROUND

For various computer vision and robotics applications, an understanding of the surrounding geometry is essential. To capture this geometry, depth estimation is often performed to produce a depth map. A depth map is an image encoding the distance from a camera to objects in the scene. Although there are different approaches to estimate depth, a common approach is stereo vision. Stereo vision uses two or more cameras from different viewpoints to photograph the scene. By matching pixels between images and knowing the relative position and orientation of the cameras, it is possible to measure the relative displacement, or disparity, of a pixel's motion from one image to another. The disparity can then be converted to depth to produce a depth image. Therefore, to estimate depth using stereovision, one must first estimate disparity.

The standard approach to disparity estimation relies on RGB images taken by two cameras (or by the same camera from two different locations), as depicted in FIG. 1.

FIG. 1 shows a stereovision system set up for computing disparity and ultimately depth from two images. The set up comprises two cameras 102, 104 used to photograph a scene 106 consisting of a sphere, cone, and cube, from different viewpoints. The left camera 102 and right camera 104 form a left image 108 and right image 110 respectively. In FIG. 1, objects from the right image 110 are shown superimposed on the left image 108, and it can be observed that objects closer to the cameras have higher displacement, or disparity. By accurately accounting for the pixel motion between the images, a disparity map 112 can be calculated. The disparity map 112 represents how much a pixel moves between the two viewpoints. Disparity is inversely proportional to depth, measuring how far away objects are located from the camera. That is, objects with high disparity are close to the camera. The disparity map is easily converted to a depth map, also known as a depth image, given additional calibration data from the cameras (for example, focal length, and baseline, which is the distance between the cameras).

In standard stereovision applications, the images are said to be RGB images, as each image coordinate consist of red, green, and blue colour samples or pixels. Each RGB image is produced by an image signal processing (ISP) pipeline, which is present in the great majority of commercial cameras to convert the physical light readings into the final observed RGB image. The ISP pipeline consists of a sequence of operations that transform RAW data collected by the image sensors of the camera into an RGB image, as depicted in FIG. 2.

FIG. 2 shows the plurality of operations in the image signal processing (ISP) pipeline. The ISP pipeline consists of a large number of sequential, modular operations that transform the RAW data 202 captured by an image sensor into an RGB image 204. The ISP shown in FIG. 2 is a simplified example of the ISP pipeline, modem ISPs may have 20 or more operation modules.

The RAW data must be handled carefully as it differs from an RGB image in several ways. The image sensor typically captures the RAW data using a colour filter array (CFA). FIG. 3 shows an example of a colour filter array (CFA) 302 on top of a grid of photosensors. The CFA consists of multiple colour filters that only pass light corresponding to specific wavelengths or colours. Using the well-known Bayer filter pattern, the CFA consists of a 2×2 pattern comprising to two green, one red, and one blue coloured filters. This pattern is tiled across the image sensor forming a mosaic of corresponding colour filters. The Bayer pattern comprises more green samples by choice, since in many natural images the green channel captures more light than the blue or red channels. However, other mosaic colour patterns exist which can be used for arranging the filters in a colour filter array, e.g. RYYB.

FIG. 3 shows RAW data being captured at an image sensor 304 with a colour filter array 302. On the right of FIG. 3 there are shown three examples of light of different wavelengths passing though different colour filters. The red filter 306 is irradiated with light comprising red, blue, and green, but only the red light represented by arrow 307 is able to pass through the filter 306. As a result, only the one or more photosensors covered by red filters detect incident light. The resulting pattern of received red light on the image sensor is shown on the image sensor grid 308. The green filter 310 is irradiated with light comprising red, blue, and green, but only the green light represented by arrow 311 is able to pass through the filter 310. As a result, only the one or more photosensors covered by green filters are able to detect incident light. The resulting pattern of received green light on the image sensor is shown on the image sensor grid 312. The blue filter 314 is irradiated with light comprising red, blue, and green, but only the blue light represented by arrow 315 is able to pass through the filter 314. As a result, only the one or more photosensors covered by blue filters detect incident light. The resulting pattern of received red light on the image sensor is shown on the image sensor grid 316. By combining all of the individual colour arrays as shown on the separate sensor grids 308, 312, and 316, and full colour filter array with a Bayer pattern as in grid 302 is created.

It should be noted that due to the CFA, at each pixel there is only one of red, green, or blue coloured light received by the photosensor below. Therefore, to produce a complete RGB image it is necessary to interpolate the missing colours so that each pixel has a red, green, and blue colour. Typically, the demosaicing step 206 in the ISP of FIG. 2 performs this operation. However, demosaicing becomes a difficult problem since two-thirds of the total colour data is missing in the RAW captured data. This problem is also said to be ill-posed in that there is no unique solution when performing the demosaicing. Demosaicing any one of multiple RAW images may give rise to the same demosaiced RAW image. That is, this becomes a many-to-one problem-solution type of problem. This may be described as non-linear, as there is not only one line of operation which can be followed which will translate from the initial data to the resulting data and be simply reversed to get back to the initial data. Typical demosaicing methods incorporate additional priors to produce a likely solution in order to tackle this issue.

As stated above, the standard stereovision pipeline relies on RGB images to compute disparity and depth. This is a classic problem in computer vision fields which has been previously tackled in academic literature. Fundamentally, the stereovision problem seeks to find, for each point in one image, a matching point, or correspondence, in the other image. In practice, finding correspondences is difficult for several reasons. For example, a correspondence between the left and right images might not exist due to occlusion, or disocclusion. This happens when the one or more pixels attempting to be matched between the images are generated by features which are hidden when the scene is viewed from the different angle of the different camera. For example, the front bottom right-hand corner of the cube 112 in the scene of FIG. 1 is hidden behind the sphere 114 in the image 108 captured by the left camera 102. In other words, a point may be visible in one image, but not visible in another. Thus, finding a match for that point may be impossible.

In another example, the match may be similarly impossible due to differences in appearance. For example, differences in the images resulting from illumination changes, specular reflection, etc. It may be difficult to establish that a correspondence point exists in the field of view of one image compared to another. That is, a matching point may change its colour or brightness as a result of how light reflects off of an object in the scene in dependence on the angle the object is viewed from.

For a single point in one image, finding a corresponding matching point in another image may be ambiguous. For example, in the case where there are many possible matches in the other image. This is particularly true for homogenous regions which lack the texture to enable the identification of the matching pixel within that region. Geometric constraints, commonly summarized as "epipolar geometry", can reduce the search space for correspondences, e.g. between a part in the first image and a part in the second image, from the entire second image (with two dimensions) down to a line or curve known as the epipolar line (with one dimension) if the relative rotation and translation between the cameras is known. However, the ambiguity may remain.

Another cause of difficulty in determining depth are transparent objects. The transparent surfaces can create challenges in accurate matching since the colour observed at a pixel may result from multiple surfaces in three dimensions.

Consequently, stereo vision remains an open problem and active area of research. A possible approach is discussed in Khamis et al., "StereoNet: Guided Hierarchical Refinement for Real-Time Edge-Aware Depth Prediction," Proc. ECCV 2018, also known as StereoNet. StereoNet uses an end-to-end deep architecture for real-time stereo matching. The method relies on a Siamese network, i.e. taking two inputs with a shared encoder, to extract features from the left and right images. A first disparity estimate is computed in a very low resolution cost volume, then hierarchically the model reintroduces high-frequency details through a learned up-sampling function that uses compact pixel-to-pixel refinement networks. A similar method is demonstrated by Tonioni et al., "Real-time Self-adaptive Deep Stereo," Proc. CVPR 2019, which adaptively adjusts the stereo disparity estimation to a given stereo video sequence. However, both of the above mentioned methods suffer from limitations that result from the ISP required when using RGB images as the input.

After the original Semi-Global Matching; as described in Hirschmuller et al., "Stereo Processing by Semiglobal Matching and Mutual Information," IEEE Transactions on Pattern Analysis & Machine Intelligence, 30(2), 2007, there has been a follow-up work by Liu et al., "A new stereo matching method for RAW image data based on improved SGBM," Proc. International Symposium on Optoelectronic Technology and Application 2018, which works with images from an intermediate stage of the ISP pipeline. In this method the disparity estimation is done before white balancing, colour correction, contrast and sharpness operations in the ISP pipeline. However, if operations such as black level adjustment, defective pixel correction, and notably demosaicing, have already been performed then the method relies on typical methods for disparity estimation.

Other examples of methods of disparity estimation are discussed in the following work. Von Zitzewitz et al., "Image processing method for determining depth information from at least two input images recorded with the aid of a stereo camera system," US20120127275A1 estimates disparity and depth from stereo imagery by transformation into signature images, applying a matching cost, and performing statistical ranking. 이동하 et al., "Method and apparatus for distance estimation using stereo camera", KR20180096980A, perform stereo matching utilizing local and global image information for matching. However, the input images in this method are already demosaiced. Ciurea et al., "Systems and methods for performing depth estimation using image data from multiple spectral channels," US8780113B1 describes performing depth estimation over different spectral bands for multi-view stereo where every pixel is an individual camera. However, this method only works on light fields, and is not applicable to grid sensor pinhole cameras.

It is desirable to develop a disparity and depth estimation which minimises the processing due to operations of the ISP, but which does not degrade the quality of the depth map obtained.

SUMMARY OF THE INVENTION

According to one aspect there is provided a device for performing depth estimation on first and second images captured using one or more cameras having a colour filter array, each image comprising multiple colour channels which each correspond to a respective colour channel of the colour filter array, the device being configured to perform depth estimation by estimating disparity from the colour channels of the images.

The device may be configured to identify overlapping portions of the images and to perform the depth estimation in dependence on that identification. This may allow the images to provide a perspective or stereoscopic view of a common subject.

The images may be captured from spatially offset locations, for example by two spaced-apart cameras on a common platform, or by one camera that is moved from one location to another. This can facilitate the capture of images that provide useful depth information.

The colour channels may comprise at least two colour channels that correspond to different colours. This may allow the image to be a colour image. The colour channels may be colour channels as captured by the photosensitive sensor after going through colour-specific filters.

The colour channels may comprise at least two colour channels that correspond to the same colour. The colour may be green or yellow. This may conveniently arise when an image sensor is arranged according to a Bayer pattern.

The device may be configured to perform depth estimation by estimating disparity from the said two colour channels of the image This can provide an effective way of estimating depth.

The device may be configured to estimate disparity from the colour channels without having performed a non-linear operation on the colour channels. The device may comprise an image signal processor and the device may be configured to estimate disparity from the colour channels without having processed the colour channels by means of the image signal processor. The device may be configured to estimate disparity from the colour channels independently of any conversion of the colour channels to an RGB colour space. These features may allow for better depth estimation, e.g. when the colour channels that are processed are those as captured by an image sensor.

The cameras may be spaced-apart cameras comprised in the device and configured to capture images of overlapping fields of view. This may allow a convenient way for overlapping images to be captured.

The device may be configured to perform depth estimation by the steps of: for each colour channel of the images, estimating a cost volume for differences between those colour channels; and for each colour channel of the images, estimating a disparity in dependence on the respective cost volume. This may provide an efficient processing mechanism.

The device may be configured to perform depth estimation by the steps of: estimating a common cost volume for differences between all the colour channels of the images; and estimating a disparity in dependence on that common cost volume. This may provide an efficient processing mechanism.

The device may be configured to weight the or each estimated disparity by a spatially varying weighting function. The weights may be used to assist estimation of depth.

The spatially varying weighting mechanism may be configured to use weights in relation to one channel that are learned by a machine learning algorithm in dependence on disparities in another channel. This may allow for better estimation of depth by using information across multiple colour channels.

The device may be configured to perform the depth estimation by means of a trained machine learning algorithm. This may provide an efficient way to implement the processing.

According to a second aspect there is provided a method of training a machine learning algorithm to perform depth estimation on first and second images captured using one or more cameras having a colour filter array, the method comprising: configuring a first instance of the algorithm to receive multiple colour channels which each correspond to a respective colour channel of the colour filter array and perform depth estimation by estimating disparity from the colour channels of the images; comparing an output of the first instance of the algorithm with an expected output; and forming a second instance of the algorithm in dependence on the result of the said comparison.

The algorithm is an end-to-end trainable algorithm. This may assist in efficiently training the algorithm.

The method may comprise receiving colour image training data; estimating by means of a programmed computer colour channels in dependence on the training data; and providing the estimated colour channels as input to the first instance of the algorithm. This may allow colour channel data to be estimated from a previously processed image, for example an image in RGB format.

The first instance of the algorithm may be configured to perform depth estimation by the steps of: for each colour channel of the first and second images, estimating a cost volume for differences between those colour channels; and for each colour channel of the first and second images, estimating a disparity in dependence on the respective cost volume. This may provide an efficient processing mechanism.

The first instance of the method device may be configured to perform depth estimation by the steps of: estimating a common cost volume for differences between all the colour channels of the images; and estimating a disparity in dependence on that common cost volume. This may provide an efficient processing mechanism.

BRIEF DESCRIPTION OF THE FIGURES

The present invention will now be described by way of example with reference to the accompanying drawings. In the drawings:

FIG. 4 shows a deep learning pipeline for depth estimation with RAW stereo image inputs;

DETAILED DESCRIPTION OF THE INVENTION

Figure 1:
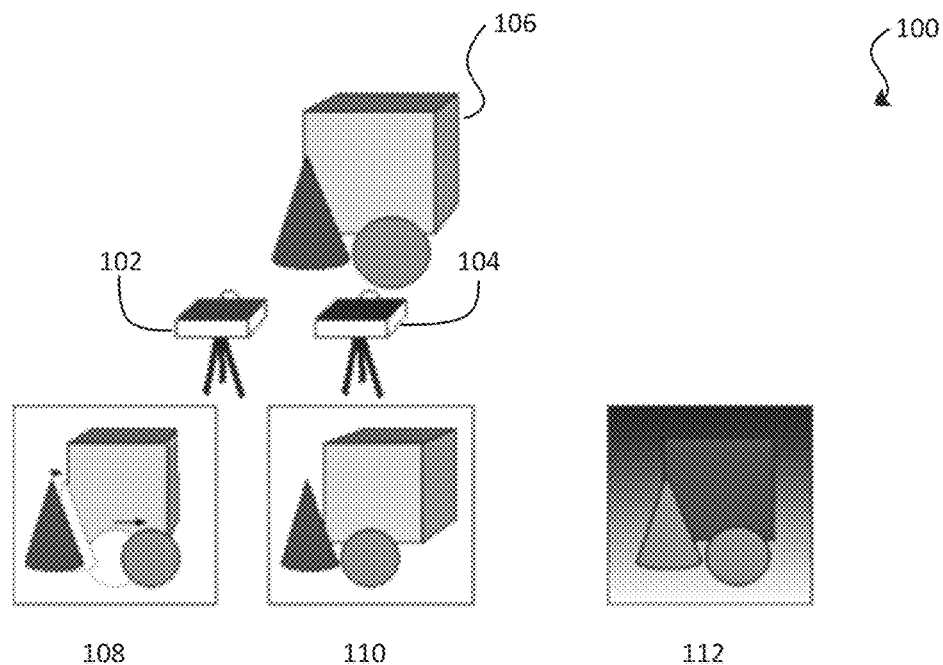
FIG. 1 shows a typical stereovision set up for computing disparity and depth from two images.
Figure 2:
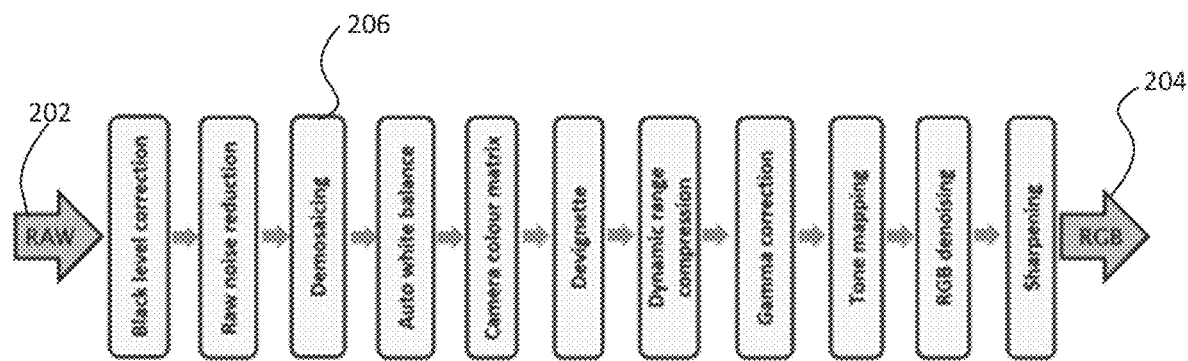
FIG. 2 shows the plurality of operations in a typical image signal processing (ISP) pipeline.
Figure 3:
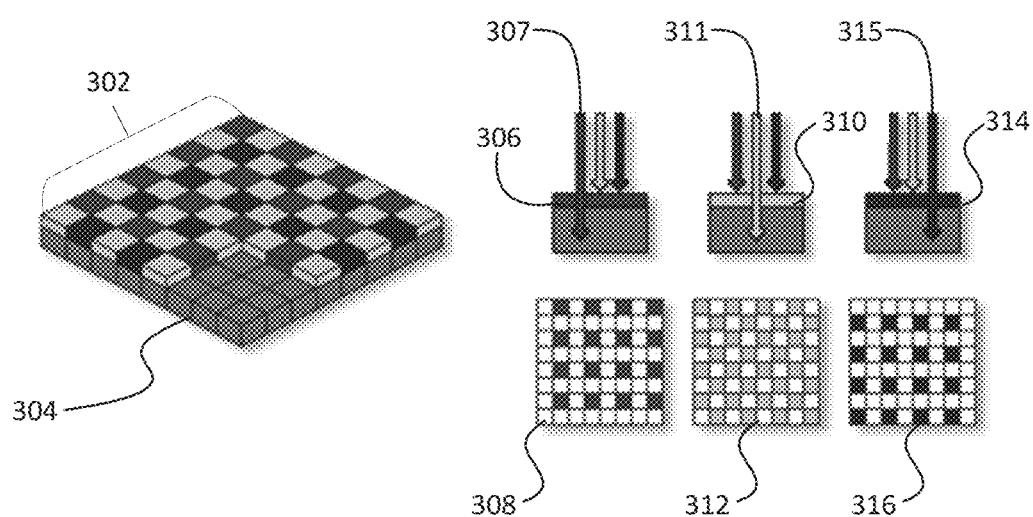
FIG. 3 shows RAW data being captured at an image sensor with a colour filter array.

This presently proposed approach performs disparity estimation, or equivalently depth estimation as the camera calibration and baseline are known, using RAW image data instead of RGB images. This has several advantages. Operations in the ISP are complex, non-linear, and can potentially result in information loss through clipping and dynamic range compression. Typically. RAW images have a higher number of possible values, for example, 10 to 16 bit per colour, but the RGB image will usually undergo a dynamic range compression down to 8 bit per colour. Additionally, as explained above, the demosaicing step as well as other modules in the ISP may result in errors and interpolation artifacts. In the ISP, any errors in the upstream modules will propagate downstream to the final RGB image that is produced. Hence by simplifying the ISP pipeline these errors may also be minimised. By performing stereo estimation directly on the RAW image, complications that might arise due to the ISP may be avoided. That is, by starting from the physically acquired data the problem of quality degradation through interpolation from demosaicing is overcome. Additionally, when the purpose of the image formation is to estimate depth, considerable computational savings may be possible as the ISP can be skipped altogether. Rather, the disparity estimation can be immediately computed directly from the RAW data. Thus, it is proposed to estimate depth directly from two or more RAW images captured from different viewpoints. That is, the data from which the depth map is created is the RAW data as detected at the image sensor through the colour filter array, and the chain of operations in the ISP is not performed.

Specifically, there is proposed a deep learning pipeline for depth estimation whose inputs are RAW stereo images from two different cameras as depicted in FIG. 4. The proposed method of disparity and depth estimation comprises an end-to-end trainable artificial neural network which is utilized to directly determine a cost for the stereo matching task and to estimate the disparity map that decodes the depth. Cost volume as referred to herein is the probabilistic way of recording depth. As processing in this proposed approach is performed directly on colour filter array (CFA) data, i.e. RAW data, no image signal processor (ISP) is required. FIG. 4 shows the StereoRAW proposed method 400; taking two RAW images 402 and 404 as the input which have not yet undergone the ISP processing, and by passing them through a neural network architecture 406 which is RAW specific, producing a disparity map 408.

The proposed method may be implemented as part of a device for performing depth estimation on first and second images captured using one or more cameras. The one or more cameras have a colour filter array, and each captured image comprises multiple colour channels which each correspond to a respective colour channel of the colour filter array. The device may therefore be configured to perform depth estimation by estimating disparity from the colour channels of the images. That is, without a prior step of ISP processing. The estimation of disparity may therefore be made based directly on the data as sampled at each pixel location, even though each pixel location will only have information for one of the colour channels of the colour filter array due to the filter pattern (i.e. each different colour channel covers different sensor coordinates and no coordinate is covered by more than one colour channel). That is, the coordinate (x,y) in each colour channel will represent a different image coordinate, and there is no overlap between the colour channels, e.g. Image(0,0) may not be the same as green(0,0) or blue(0,0), but may be the same as red(0,0). The colour channels used have the pixel displacements among them.

Figure 5A:
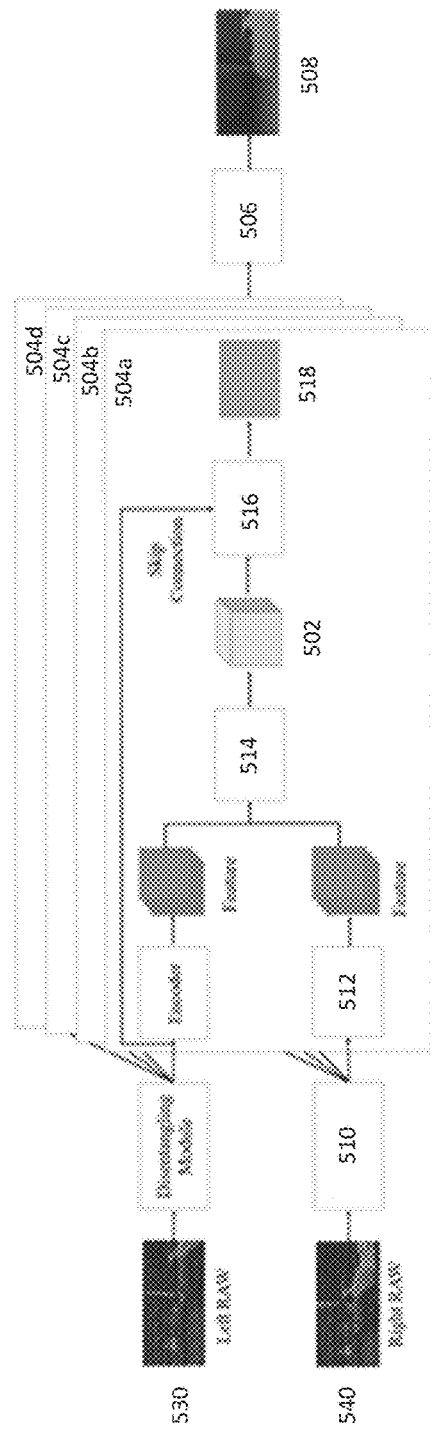
FIG. 5A shows a proposed architecture option with separate cost volumes obtained after disentangling the RAW data.
Figure 5B:
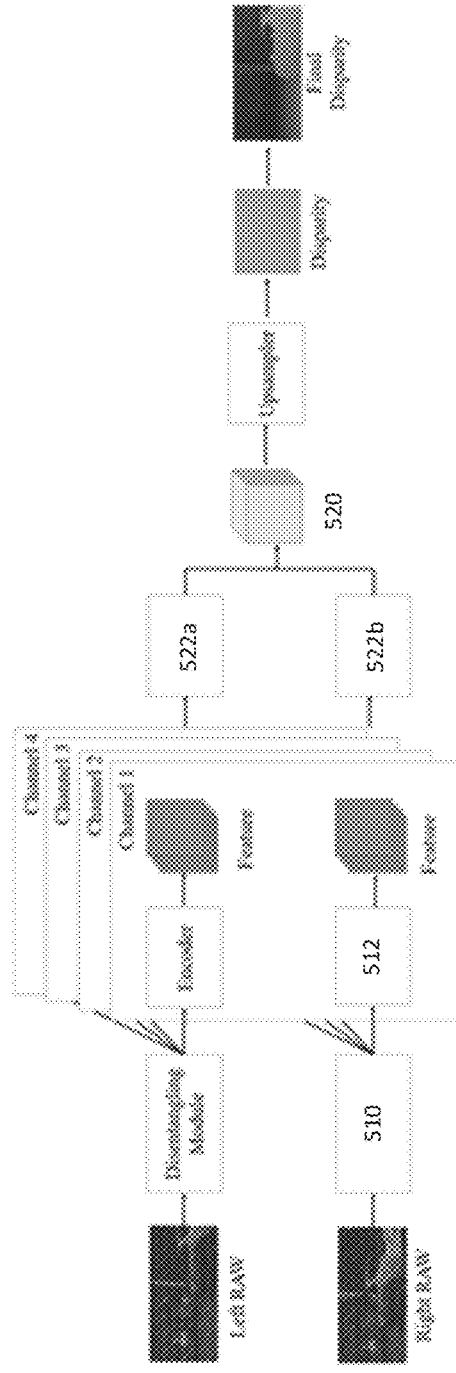
FIG. 5B shows a proposed architecture option with fused cost volume estimation.

The designed network architectures for the proposed StereoRAW pipeline are described below. FIGS. 5A and 5B show the two different proposed network architectures, one with separate cost volumes obtained after disentangling the RAW data, the other one with a single fused cost volume obtained after disentangling the RAW data and subsequent feature fusing of the separated channels. The depth estimation may be performed by, for each colour channel of the images, estimating a cost volume for differences between those colour channels and estimating a disparity in dependence on the respective cost volume. Alternatively, the depth estimation may be performed by estimating a common cost volume for differences between all the colour channels of the images and estimating a disparity in dependence on that common cost volume.

Both of the two neural networks proposed for the StereoRAW approach to depth estimation enable the removal of the typical image signal processing (ISP) pipeline. The ISP pipeline is not required for depth estimation in the proposed approach, and its removal also prevents the introduction of complicated noise patterns.

FIG. 5A shows the first proposed architecture option with separate cost volumes obtained after disentangling the RAW data. It comprises performing separate cost volumes 502 on the disentangled colour channels, 504a, 504b, 504c, and 504d. Each channel branch 504 works separately and they are only fused together at the end 506 to provide a combined disparity estimation 508 which accounts for the disparity estimated for all of the channels 504a-d.

Specifically, the first proposed approach starts by providing RAW image data obtained with a CFA having a Bayer pattern. This RAW data is then extracted into the different colour channels, e.g., R, G, G, and B by a disentangling module 510. The colour channels comprise at least two colour channels that correspond to different colours. In some cases the colour channels may comprise at least two colour channels that correspond to the same colour, for example green or yellow. The specific colour channels depend on the CFA used and may for example be Red, Yellow, Yellow, Blue (RYYB), or Red, Green. Green, Blue (RGGB).

A de-convolutional layer is used to recover the full resolution of the input image, while the pixel shifts are addressed by making sure that the corresponding corners are aligned before and after the up-sampling. A residual block then follows to refine the recovered full resolution input. The different colour channels 504a-d are then processed separately by respective encoders 512, and matched against the other view of feature maps to construct the cost volume 502 via a cost volume generator process 514. A coarse disparity map is then generated from the cost volume and will be gradually refined by the guided up-sampling module 516 to produce a refined disparity map 518. A late fusion module 506 is then designed to attend to different disparities from different colour channels along with another residual module to further refine the full disparity and produce the final disparity map 508.

A device implementing the proposed method may be configured to perform depth estimation by estimating disparity from two of the colour channels of the image. The estimate of disparity from the colour channels may be determined without having performed a non-linear operation on the colour channels. A device implementing the proposed approach may comprise an image signal processor. In such a case the device may be configured to estimate disparity from the colour channels without having processed the colour channels by means of the image signal processor. The disparity may be estimated from the colour channels independently of any conversion of the colour channels to an RGB colour space.

The alternative proposed approached using the architecture shown in FIG. 5B comprises many of the same components and processes of the architecture described above and shown in FIG. 5A. However, the alternative approach comprises a fused cost volume estimation 520, which can avoid unnecessary interpolation at the beginning of the proposed separated StereoRAW approach described above. That is, the architecture of FIG. 5B fuses the separate colour channels at an earlier stage in the proposed general approach. The benefit of this fused cost volume architecture is that the initial interpolation step which may bring in information which is incorrect can be avoided. The second architecture, shown in FIG. 5B and comprising a fused cost volume estimation 520, achieves this by separating or unstacking the CFA input images into four channels for each image of the stereo pair. One full resolution feature map per view 522a and 522b is then formed by mapping the pixel positions into the feature map 522. The fused features 522 from the left and right view may then be used to produce one cost volume 520. Similar to the separate cost volumes approach, the coarse disparity will then be obtained from the cost volume and further refined with the help of original RAW images or some processed version of them.

The proposed general approach uses the stereo RAW images instead of the typically used stereo RGB images from an ISP pipeline. The neural network of the proposed approach encodes the RAW information directly and makes the comparison between the left and right views, thereby taking care to account for the CFA Bayer patterns. The RAW input images are acquired from two attached cameras, one left and one right. Thus, the images are captured from spatially offset locations. The device implementing the proposed method is configured to identify overlapping portions of the images and to perform the depth estimation in dependence on that identification. The proposed deep network is able to encode RAW images with CFA Bayer patterns and utilise epipolar geometry to learn the final disparity. Thus, the modalities are StereoRAW images forming the input and a disparity map forming the output.

Below is described the architecture for the proposed approach in more detail. For simplicity, the details of the network are only given for one viewpoint, e.g. the viewpoint of the left camera. The operations used for the images taken from the other viewpoint e.g. the right camera's viewpoint, are the same. Each of the processing routes, e.g. the left and right camera processing branch of FIG. 5A, may share weights. The one or each estimated disparity may be weighted by a spatially varying weighting function. The spatially varying weighting function or mechanism is configured to use weights in relation to one channel that are learned by a machine learning algorithm in dependence on disparities in another channel. Thus, the depth estimation may be performed by means of a trained machine learning algorithm. These weights are therefore parameters of the neural network which are learned during training and may or may not be interdependent on one another.

In an example implementation of the proposed approach the left and right cameras may be spaced-apart cameras comprised in the same device and configured to capture images of overlapping fields of view.

The detailed architecture of different modules will now be described in relation to the overall architecture of the proposed approach described above. Specifically, the detailed architecture of the separated cost volume estimation architecture of the proposed approach as in FIG. 5A. It should be appreciated that modules present in both of the different architectures shown in FIGS. 5A and 5B may be arranged with the same detailed architecture as described below.

Figure 6:
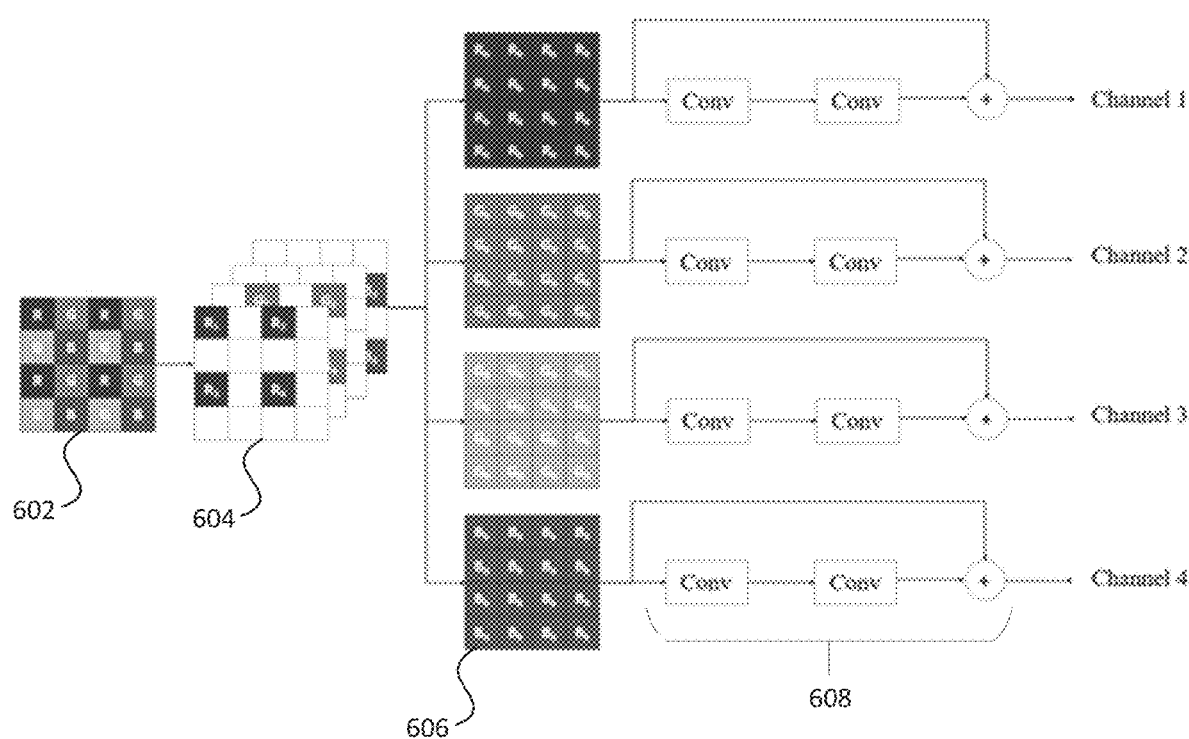
FIG. 6 shows a possible architecture design for a disentangling module.

FIG. 6 shows a possible architecture design for the disentangling module 510 present in both left and right viewpoint branches of FIGS. 5A and 5B. The RAW input image 602 is first separated into the different colour channel data 604, while maintaining the spatial distribution of the single colour channel RAW data. The data is then interpolated to provide the missing respective colour channel data for the areas of the image where the CFA did not comprise the respective filter colour. That is, the gaps in the colour channel data where a filter of a different colour blocked the incident light of that colour are filled in by a bilinear interpolation process 606. A full resolution image for each colour channel is then separately available and operated on in its respective colour channel branch. These operation modules 608 may comprise one or more convolution modules with guidance provided by the initial full resolution single colour channel data. Each colour channel of the input RAW image data may now be operated on separately at a same resolution as the original RAW input.

Figure 7:
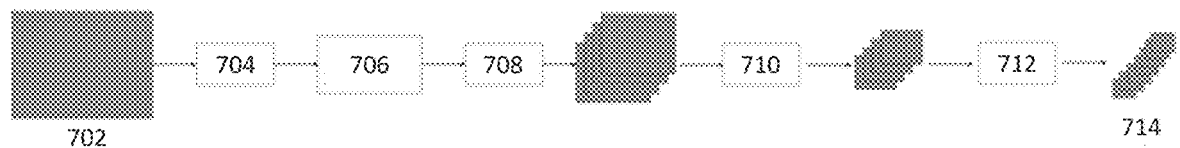
FIG. 7 shows a possible architecture design for an encoder module.

FIG. 7 shows a possible architecture design for an encoder module 512. For each single colour channel input an encoder module 512 operates on the left and the right branch separately. That is, each of the left side 530 and the right side 540 RAW images may be operated on by a different encoder, or by the same encoder but operating separately on the images of each viewpoint and for each colour channel. The example encoder of FIG. 7 is provided with input images 702 which comprise the RAW data for a single colour channel and a single viewpoint. These images 702 are then operated on by a convolution layer 704, three residual blocks 706, and a further convolution layer 708. After two more convolution layers 710 and 712, a series of output images or feature maps 714 are provided.

Figure 8:
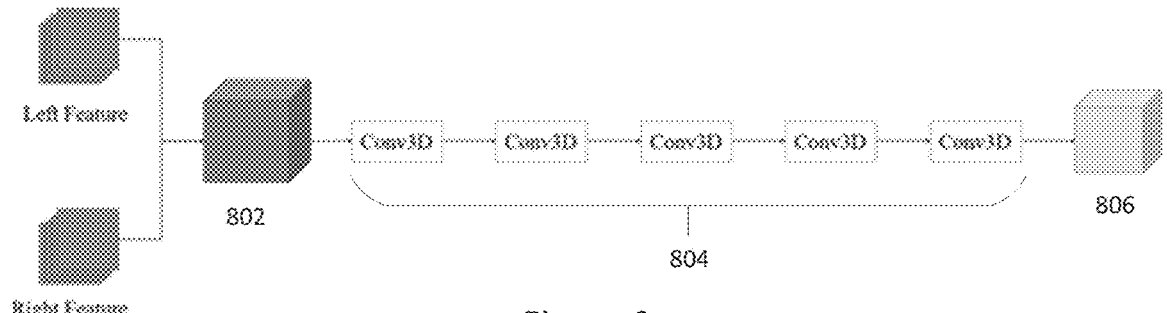
FIG. 8 shows a possible architecture design for a Cost Volume Generator module.

FIG. 8 shows a possible architecture design for a Cost Volume Generator module 514. The cost volume generator operates on the left and right viewpoint data to determine a coarse cost volume 802 and refines this to a more refined cost volume. The cost volume generator may work either on left and right viewpoint data for a single colour channel at a time as in FIG. 5A, or left and right viewpoint data having been fused to contain all the different colour channels of the particular viewpoint as in FIG. 5B. After generating a coarse cost volume 802, five convolution layers 804 may be implemented before outputting a refined cost volume 806.

Figure 9:
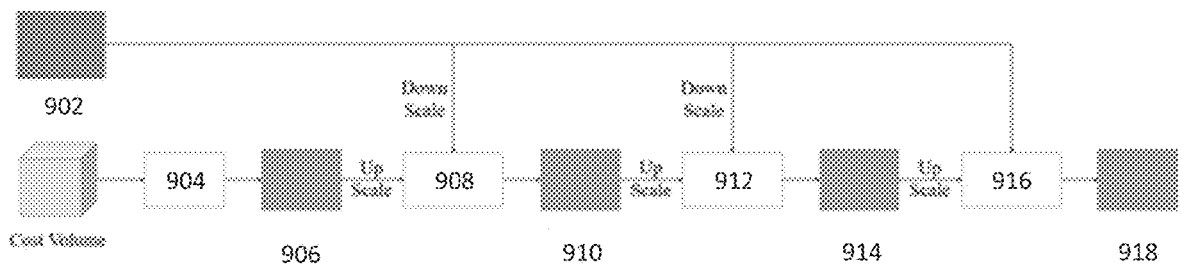
FIG. 9 shows a possible architecture design for a decoder/guided up-sampler module.

FIG. 9 shows a possible architecture design for a decoder/guided up-sampler module. In this particular example the cost volume is up-sampled with a guide provided by the input image 902. The cost volume is incrementally up-sampled via a soft argmin calculation 904 which provides an image with a ⅛ scale disparity 906. The image is then hierarchically upscaled via a depth refinement module 908 with guidance from the input image 902 to provide a first image with a ¼ scale disparity 910. Another round of upscaling via a further depth refinement 912 process with guidance from the input image 902 provides an image with a M scale disparity 914. A final round of upscaling via a final depth refinement process 916 provides an image with a full scale disparity 918.

Figure 10:
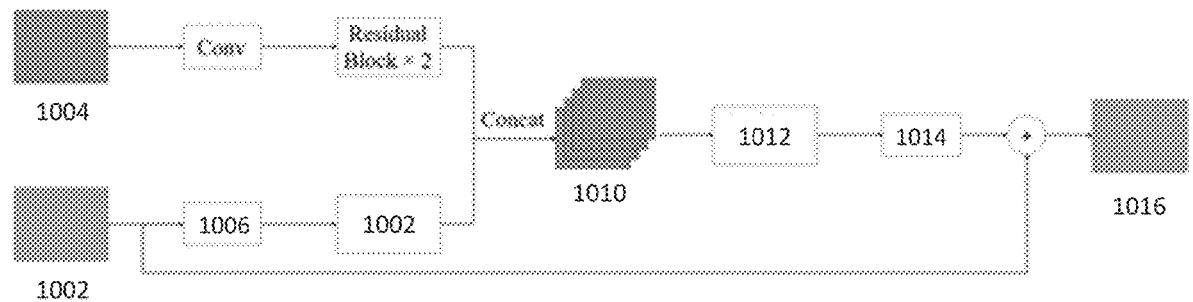
FIG. 10 shows a possible architecture design for a depth refinement module.

FIG. 10 shows a possible architecture design for a depth refinement module. The depth refinement module refines the disparity of the up-sampled full scale disparity image 1002 by concatenating it with the processed image 1004. Both inputs move through a respective convolution layer 1006 and two residual blocks 1008 before the concatenation 1010. After which, a further four residual blocks 1012 and a final convolution layer 1014 result in a refined disparity output 1016.

Figure 11:
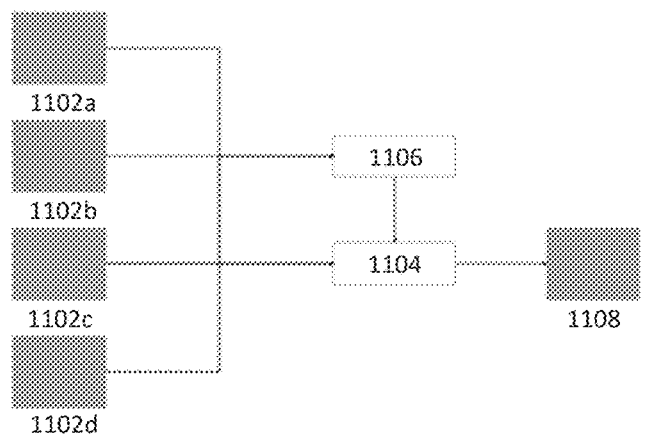
FIG. 11 shows a possible architecture design for post fusion as depicted in FIG. 5A.

FIG. 11 shows a possible architecture design for late fusion as in FIG. 5A. The late fusion 506 comprises fusing 1104 the refined disparity for each colour channel 1102a-d, with attention 1106, to produce the final disparity 1108.

To train the neural network of the proposed approach in a supervised learning way, the pixel-wise difference between the predicted disparity and ground truth disparity is minimized on different scales and different channels. For example, the following energy term equation (1) illustrates how the separate pixel-wise losses for each part are combined.

$$L_{Total} = L_{raw} + L_{red} + L_{green1} + L_{green2} + L_{blue} \quad (1)$$

For each colour channel a pixel-wise reconstruction loss is applied. More specifically, an L1 loss on predicted disparity and ground truth disparity for the raw images is performed according to the below equation (2).

$$L_{raw} = \sum \Big( |D_{Pred} - D_{GT}|_{Scale=1} + \\ |D_{Pred} - D_{GT}|_{Scale=\frac{1}{2}} + |D_{Pred} - D_{GT}|_{Scale=\frac{1}{4}} + |D_{Pred} - D_{GT}|_{Scale=\frac{1}{8}} \Big) \quad (2)$$

Similarly, equation (2) also provides the reconstruction loss on different colour channels and different scales: $L_{red}$, $L_{green1}$, $L_{green2}$, $L_{blue}$.

In order to train the proposed neural network for the proposed RAW approach and quantify the performance of the pipeline with pixel-perfect ground truth, it is also necessary to create a new simulated dataset specifically for the task.

As there is no RAW stereo dataset already available in the vision community which meets the necessary requirements, a new dataset can be created, for example based on a SceneFlow Dataset available from Freiburg University (as found at lmb.informatik.uni-freiburg.de/resources/datasets/SceneFlowDatasets.en.html).

Figure 12:
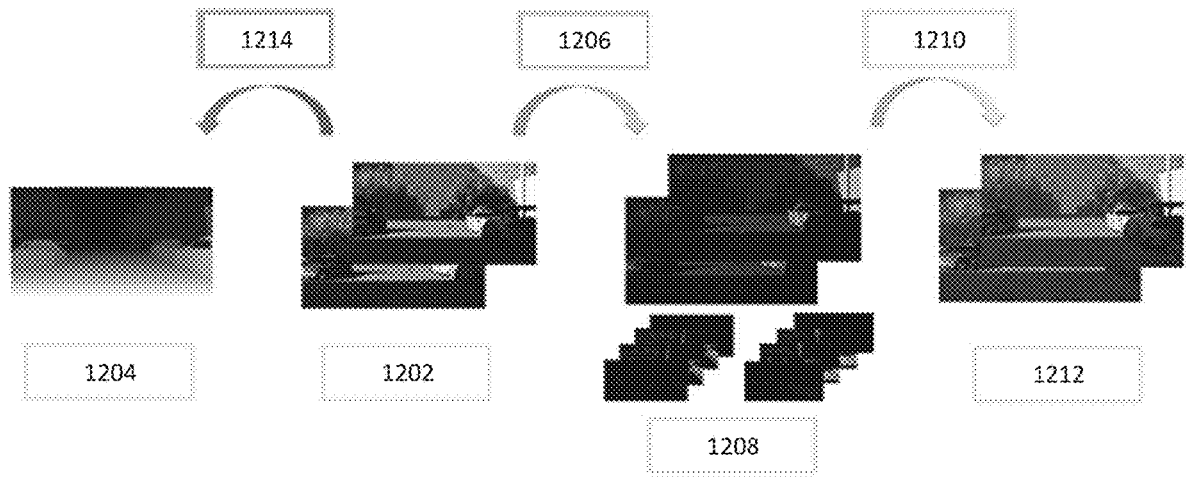
FIG. 12 shows the procedure for creating a dataset for training a machine learning algorithm to produce disparity and depth maps directly from RAW data.

FIG. 12 shows the procedure for creating a dataset for training the network to produce disparity and depth maps directly from RAW data. The process begins with a set of stereo image pairs or colour image training data and their ground truth disparities. The images are all then centre cropped to a fixed image size of 640×480 pixels. An inverse ISP pipeline is then applied to generate the RAW images from the clean RGB data. As traditional methods work on the RGB images after the ISP process, the ISP pipeline is then applied on the RAW images to obtain the RGB images for comparison. That is, the existing dataset comprises the data RBG(1) images and their disparity, but the required data is RAW images and their disparity. Therefore, it is possible to take the RGB(1) images and calculate a RAW data set from them by performing an inverse ISP process. In order to fairly compare the RAW data approach presented herein with the "traditional" RGB approach, this RAW data is then put through an ISP to get a second set of RGB(2) images. The ground truth disparity therefore still remains the same, but it is then possible to train the neural network to produce the estimated disparity from RAW data and compare this to generating estimated disparity form the RGB(2) image data as the input. This is necessary as there is degradation when the inverse ISP pipeline is applied to create the RAW data that would not be reflected if simply taking the RGB(1) image data as the comparison input. That is, RGB(1) would provide an unfair input to use in the comparison to reflect the real case situation where the RAW data is collected first. The ground truth disparity in FIG. 12 is shown as being created via ray tracing. However, other methods for producing a ground truth disparity from RGB image data may also be used.

The proposed method of training a machine learning algorithm to perform depth estimation on first and second images captured using one or more cameras having a colour filter array comprises the following steps. Configuring a first instance of the algorithm to receive multiple colour channels which each correspond to a respective colour channel of the colour filter array and perform depth estimation by estimating disparity from the colour channels of the images. This is then followed by comparing an output of the first instance of the algorithm with an expected output, e.g. from the dataset created as described above. A second instance of the algorithm is then formed in dependence on the result of the said comparison.

In an example implementation the algorithm may be an end-to-end trainable algorithm. The training of the algorithm may comprise receiving colour image training data and estimating by means of a programmed computer a plurality of colour channels in dependence on the training data. The estimated colour channels may then be provided as input to the first instance of the algorithm. The training may then involve iterations of the depth estimation task as it would be performed on inference, to iteratively improve and train the algorithm. This stage may involve training the algorithm to operate in either of the two alternative cost volume processes. That is, the first instance of the algorithm may be configured to perform depth estimation by the steps of, for each colour channel of the first and second images, estimating a cost volume for differences between those colour channels of the respective images and then estimating a disparity in dependence on the respective cost volume. Alternatively, the first instance of the algorithm may be configured to perform depth estimation by the steps of estimating a common cost volume for differences between all the colour channels of the images and then estimating a disparity in dependence on that common cost volume.

The above described approach obtains higher depth accuracy than previous methods which operate in the RBG domain. This is because noise behaves in a more predictable way in the raw domain, i.e. before undergoing complex non-linear operations in the ISP pipeline such as demosaicing. The proposed depth estimation method also enables depth information to be available for use in other tasks, e.g. image alignment, directly after the sensor readings are taken.

Some of the potential advantages of the above described approach comprise:

By performing stereo depth estimation using two or more cameras and their native colour filter array (CFA) data it is possible to leverage photon measurements at geometrically correct locations on the sensor grid.

By performing disparity estimation using RAW data processing and without implementing the typical image signal processor (ISP), it is possible to use more accurate measurements without incurring any errors from the typical ISP pre-processing steps. The operation without ISP thus provides more efficient data usage due to fewer operations and therefore potentially better noise removal. The non-linear operators from the ISP are able to be skipped.

By implementing an end-to-end trainable neural network with RAW input and disparity and/or depth output it is possible to provide a learned common latent space which allows for data aggregation in a single cost volume. It is also possible to have an alternative implementation which fuses the wavelength dependent information after individual disparity estimation.

As a result of using a methodology-agnostic training stage the training methods including fully supervised training as well as a self-supervision loss can be used. A reverse ISP can also be leveraged to provide the training in the absence of ground truth annotations for RAW data.

Some results of testing the proposed method are shown in Table 1. The proposed method outperforms the traditional approach using RGB images, showing that starting from RAW images may benefit the depth estimation.

TABLE 1

Depth estimation performance of various methods on the created StereoRAW dataset, where EPE stands for "End Point Error" and is the averaged absolute error.

| Method | EPE | Improvement over classical RGB stereo |
|---|---|---|
| Stereo Matching on Ground Truth RGB | 1.2342 | — |
| (Upper Bound) StereoNet with RGB | 1.4646 | ±0.0% |
| StereoRAW network using RAW data with early fusion and refinement (FIG. 5B) | 1.4495 | +1.0% |
| StereoRAW network using RAW data with pre- and post-correction | 1.3937 | +4.8% |

Figure 13:
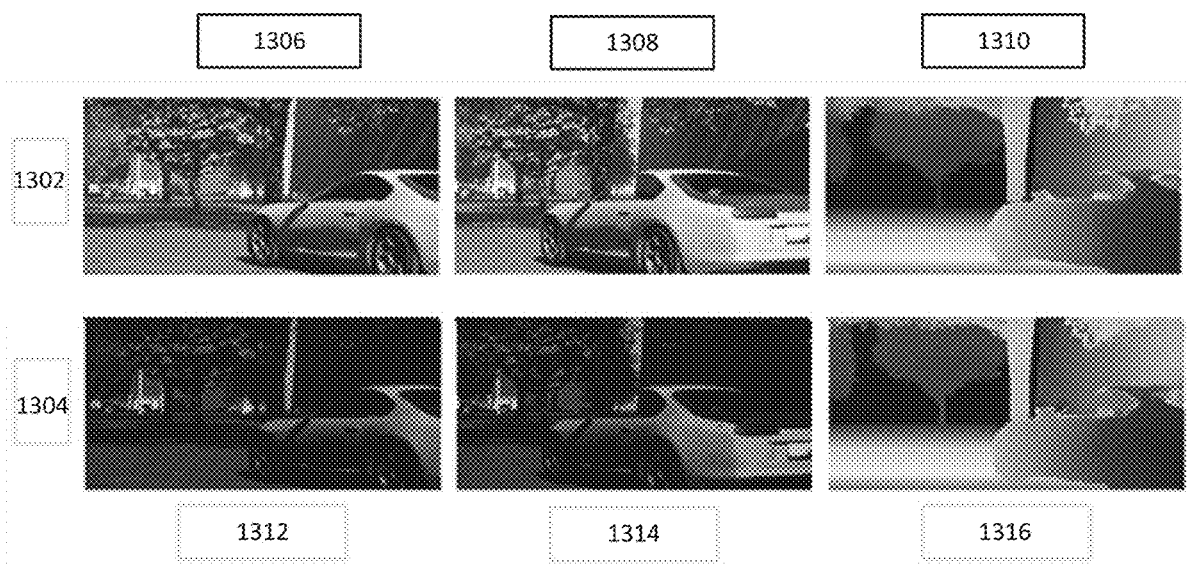
FIG. 13 shows some qualitative results of the proposed approach compared to a typical approach, both using the StereoRAW dataset.

FIG. 13 shows some qualitative results of the proposed approach compared to a typical approach, both using the StereoRAW dataset. The top row 1302 of images shows the input and output for the typical RGB ISP based method of obtaining a depth map. The bottom row 1304 of images shows the input and output of the proposed StereoRAW method of obtaining a depth map from RAW data (which comprises a neural network or machine learning algorithm). On the top row 1302 are shown the input RGB image 1306 for the left camera, and the RGB image 1308 for the right camera as taken from the created StereoRAW dataset. The depth map 1310 which results from the typical RGB ISP based disparity and depth estimation is shown on the right hand-side with grey-level coding for different disparities. On the bottom row 1304 are shown the input RAW image 1312 for the left camera, and the RAW image 1314 for the right camera as taken from the created StereoRAW dataset. The depth map 1316, which results from the herein proposed approach based on RAW data being directly used to generate disparity and depth estimations, is shown on the right hand-side of the bottom row with the same grey-level coding. It can be seen that some details in the RGB generated depth map 1310 are not present in the RAW generated depth map 1316, and vice versa. However, where additional details in the RGB depth map 1310 exist it can be seen from the RGB images that these likely stem from details based on colour variation which have been incorrectly attributed to changes in depth.

Figure 14:
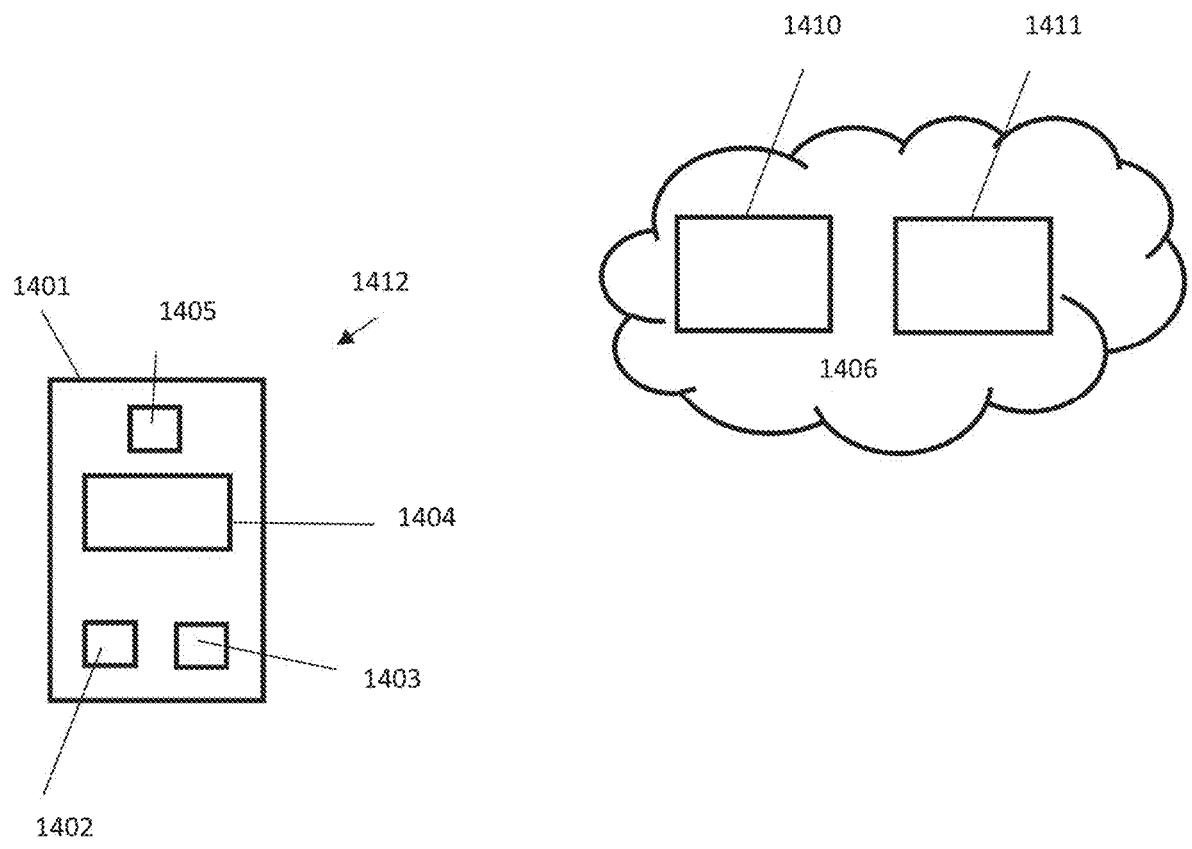
FIG. 14 shows an example of a device configured to implement the proposed depth processing on RAW images taken by an image sensor in a camera.

FIG. 14 shows an example of a device configured to implement the proposed depth processing on images taken by an image sensor 1402 in the camera 1401. The camera 1401 typically includes some onboard processing capability. This may be provided by the processor 1404. The processor 1404 may also be used to perform the essential operating functions of the camera. The camera typically also comprises a memory 1403.

The transceiver 1405 is capable of connecting to a network and communicating over the network with other entities 1410, 1411. Those entities may be physically remote from the camera 1401 as described above. The network may be a publicly accessible network such as the internet. The entities 1410, 1411 may be based in the cloud network 1406. In one example, entity 1410 is a computing entity and entity 1411 is a command and control entity. In this example these entities are logical entities and may be capable of executing all or part of the herein proposed depth processing. In practice they may each be provided by one or more physical devices such as servers and data stores, and the functions of two or more of the entities may be provided by a single physical device. Each physical device implementing an entity may comprise a processor and a memory. The devices may also comprise a transceiver for transmitting and receiving data to and from the transceiver 1405 of camera 1401. The memory stores in a non-transient way code that is executable by the processor to implement the respective entity in the manner described herein.

The command and control entity 1411 may train the artificial intelligence models used in each module of the system. This is typically a computationally intensive task, even though the resulting model may be efficiently described, so it may be efficient for the development of the algorithm to be performed in the cloud, where it can be anticipated that significant energy and computing resources are available. It can be anticipated that this is more efficient than forming such a model at a typical camera.

In one implementation, once the deep learning algorithms have been developed in the cloud, the command and control entity can automatically form a corresponding model and cause it to be transmitted to the relevant camera device. In this example, the system is implemented at the camera 1401 by processor 1404.

In another possible implementation, an image may be captured by the camera sensor 1402 and the image data may be sent by the transceiver 1405 to the cloud for processing in the system. The resulting depth map or depth image may then be sent back to the camera 1401, as shown at 1412 in FIG. 14. Alternatively, the resulting depth map or depth image may be sent to another device of the system for displaying or for use in another process.

Therefore, the method may be deployed in multiple ways, for example in the cloud, on the camera device, or alternatively in dedicated hardware. As indicated above, the cloud facility could perform training to develop new algorithms or refine existing ones. Depending on the compute capability near to the data corpus, the training could either be undertaken close to the source data, or could be undertaken in the cloud, e.g. using an inference engine. The system may also be implemented at the camera, in a dedicated piece of hardware, or in the cloud.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A device for performing depth estimation on first and second images captured using one or more cameras having a color filter array, each image of the first and second images comprising multiple color channels, each color channel of the multiple color channels corresponding to a respective color channel of the color filter array, and the device being configured to perform depth estimation by estimating disparity from the color channels of the first and second images, wherein the first and second images are original images that are not processed by image signal processing (ISP).

2. A device of claim 1, wherein each image of the first and second images comprises multiple coordinates, each coordinate of the multiple coordinates corresponding to a sample on a respective color channel.

3. A device of claim 1, wherein the device is configured to identify overlapping portions of the first and second images and to perform the depth estimation based on that identification.

4. A device of claim 1, wherein the first and second images are images captured from spatially offset locations.

5. A device of claim 1, wherein the color channels comprise at least two color channels that correspond to different colors.

6. A device of claim 1, wherein the color channels comprise at least two color channels that correspond to a same color.

7. A device of claim 6, wherein the same color is green or yellow.

8. A device of claim 5, the device being configured to perform the depth estimation by estimating disparity from the at least two color channels of the first and second images.

9. A device of claim 1, the device being configured to estimate disparity from the color channels without having performed a non-linear operation on the color channels.

10. A device of claim 1, wherein the device comprises an image signal processor and the device is configured to estimate disparity from the color channels without having processed the color channels by the image signal processor.

11. A device of claim 1, the device being configured to estimate disparity from the color channels independently of any conversion of the color channels to an RGB color space.

12. A device of claim 1, wherein the color channels are color channels formed by the color filter array.

13. A device of claim 1, wherein the cameras are spaced-apart cameras comprised in the device and configured to capture images of overlapping fields of view.

14. A device of claim 1, wherein performing the depth estimation comprises:
for each color channel of the first and second images, estimating a cost volume for differences between those color channels, and estimating a disparity based on the cost volume.

15. A method of training a machine learning algorithm to perform depth estimation on first and second images captured using one or more cameras having a color filter array, the method comprising:
configuring a first instance of the machine learning algorithm to receive multiple color channels, each color channel of the multiple color channels corresponding to a respective color channel of the color filter array and to perform depth estimation by estimating disparity from the color channels of the first and second images, wherein the first and second images are original images that are not processed by image signal processing (ISP);
comparing an output of the first instance of the machine learning algorithm with an expected output; and
forming a second instance of the machine learning algorithm based on a result of the comparison.

16. A method of claim 15, comprising unstacking the multiple color channels.

17. A method of claim 15, wherein the machine learning algorithm is an end-to-end trainable algorithm.

18. A method of claim 15, comprising:
receiving color image training data;
estimating, by a programmed computer, color channels based on the training data; and
providing the estimated color channels as input to the first instance of the machine learning algorithm.

19. A method of claim 15, wherein performing the depth estimation comprises:
for each color channel of the first and second images, estimating a cost volume for differences between those color channels, and estimating a disparity based on the cost volume.

20. A method of claim 15, wherein performing the depth estimation comprises:
estimating a common cost volume for differences between all the color channels of the first and second images; and
estimating a disparity based on the common cost volume.

* * * * *